(12) United States Patent
Dama et al.

(10) Patent No.: US 11,611,738 B2
(45) Date of Patent: Mar. 21, 2023

(54) USER INTERFACE MODULE FOR CONVERTING A STANDARD 2D DISPLAY DEVICE INTO AN INTERACTIVE 3D DISPLAY DEVICE

(71) Applicant: Saras-3D, Inc., Allentown, PA (US)

(72) Inventors: Bipin D. Dama, Bridgewater, NJ (US); Soham Pathak, Allentown, PA (US); Ankita Shastri, Orefield, PA (US); Kalpendu Shastri, Orefield, PA (US)

(73) Assignee: Saras-3D, Inc., Allentown, PA (US)

( * ) Notice: Subject to any disclaimer, the term of this patent is extended or adjusted under 35 U.S.C. 154(b) by 0 days.

(21) Appl. No.: 17/285,363

(22) PCT Filed: Oct. 21, 2019

(86) PCT No.: PCT/US2019/057284
§ 371 (c)(1),
(2) Date: Apr. 14, 2021

(87) PCT Pub. No.: WO2020/086489
PCT Pub. Date: Apr. 30, 2020

(65) Prior Publication Data
US 2021/0377514 A1    Dec. 2, 2021

Related U.S. Application Data

(60) Provisional application No. 62/748,487, filed on Oct. 21, 2018.

(51) Int. Cl.
*H04N 13/341* (2018.01)
*H04N 13/156* (2018.01)
*H04N 13/139* (2018.01)
*H04N 13/359* (2018.01)

(52) U.S. Cl.
CPC ......... *H04N 13/341* (2018.05); *H04N 13/139* (2018.05); *H04N 13/156* (2018.05); *H04N 13/359* (2018.05)

(58) Field of Classification Search
CPC .. H04N 13/341; H04N 13/359; H04N 13/156; H04N 13/139
USPC ....................................................... 348/51
See application file for complete search history.

(56) References Cited

U.S. PATENT DOCUMENTS

| 8,413,073 | B2 | 4/2013  | Lee     |
| 8,665,304 | B2 | 3/2014  | Yu et al. |
| 9,753,293 | B2 | 9/2017  | Ge et al. |
| 9,848,179 | B2 | 12/2017 | De Haan |

(Continued)

*Primary Examiner* — Tung T Vo
(74) *Attorney, Agent, or Firm* — Wendy W. Koba

(57) ABSTRACT

A 2D/3D conversion interface component is configured to override the video processing capabilities associated with a conventional 2D display, re-formatting an incoming 3D video stream into a version compatible with a 2D display while preserving the 3D-type of presentation. An incoming "side-by-side" (SBS) 3D video stream is re-formatted into a "frame sequential" (serialized) format that appears as a conventional video stream input to the 2D display. The interface component also generates as an output a timing signal (synchronized with the converted frames) that is transmitted to a 3D viewing device (e.g., glasses). Therefore, as along as the 3D viewing device remains synchronized with the sequence of frames shown on the 2D display, the user will actually be viewing an interactive 3D video.

5 Claims, 5 Drawing Sheets

(56) References Cited

U.S. PATENT DOCUMENTS

| | | |
|---|---|---|
| 9,886,178 B2 | 2/2018 | Kendall et al. |
| 2005/0275942 A1 | 12/2005 | Hartkop et al. |
| 2009/0185029 A1* | 7/2009 | Mitsuhashi ............ G11B 27/105 |
| | | 348/46 |
| 2011/0022988 A1 | 1/2011 | Lee |
| 2011/0109729 A1 | 5/2011 | Yoo et al. |
| 2011/0199457 A1* | 8/2011 | Yoshida ................. G02B 30/24 |
| | | 348/43 |
| 2011/0285815 A1* | 11/2011 | Kervec ................... H04N 19/51 |
| | | 348/E13.064 |
| 2012/0019636 A1* | 1/2012 | Gefen .................. H04N 13/398 |
| | | 348/55 |
| 2012/0027075 A1* | 2/2012 | Kamio ................. H04N 19/597 |
| | | 375/240.01 |
| 2012/0027375 A1* | 2/2012 | Yasui ................... H04N 13/398 |
| | | 386/230 |
| 2012/0033034 A1* | 2/2012 | Otsuka ................. H04N 13/161 |
| | | 348/42 |
| 2012/0050468 A1* | 3/2012 | Takahashi ............ H04N 13/341 |
| | | 348/43 |
| 2012/0050472 A1* | 3/2012 | Arai ..................... H04N 13/106 |
| | | 348/43 |
| 2012/0242797 A1* | 9/2012 | Watanabe ............ H04N 13/359 |
| | | 348/46 |
| 2014/0201656 A1 | 7/2014 | Kendall et al. |
| 2015/0245005 A1 | 8/2015 | Grossman et al. |
| 2017/0150137 A1 | 5/2017 | Kosmiskas et al. |

* cited by examiner

USER INTERFACE MODULE FOR CONVERTING A STANDARD 2D DISPLAY DEVICE INTO AN INTERACTIVE 3D DISPLAY DEVICE

CROSS REFERENCE TO RELATED APPLICATION

This application claims the priority of U.S. Provisional Application No. 62/748,487, filed Oct. 21, 2018 and herein incorporated by reference.

TECHNICAL FIELD

The present invention relates to the utilization of interactive 3D displays and, more particularly, to an interface component that is paired with a conventional 2D display device to provide 3D output graphics on the 2D device without requiring any modifications to the 2D display device itself.

BACKGROUND OF THE INVENTION

Three-dimensional (3D) stereoscopy is applied in various fields such as information communication, broadcasting, medical care, educational training, military, game, animation, virtual space, CAD, and industrial technology, and is the core technology of next-generation 3D stereoscopic multimedia information communications, which is commonly required in the various fields. For example, in the field of educational training, the ability to provide 3D-based learning tools has far-reaching applicability, particularly with respect to distance learning opportunities. While the education that takes place in a conventional classrooms inherently "three-dimensional", most on-line learning aids utilized in the distance learning setting are limited to the two-dimensional capabilities of standard computer systems, creating a barrier that prevents efficient and effective learning.

Opening up the third dimension for students using 3D technology, while also providing a holistic approach using the senses (e.g., touch, video, audio), results in a solution that will help students learn more efficiently and develop a deeper understanding through self-guided discovery, as well as teacher-guided learning. However, the expense and need for proprietary equipment in the form of a 3D-enabled display device may limit global implementation of such learning experiences.

SUMMARY OF THE INVENTION

The needs remaining in the prior art are addressed by the present invention, which relates to the utilization of interactive 3D displays and, more particularly, to an interface component that is paired with a conventional 2D display device to provide 3D output graphics.

In accordance with the teachings of the present invention, a 2D/3D conversion interface component is configured to override the video processing capabilities associated with a conventional 2D display, re-formatting an incoming 3D video stream into a version compatible with a 2D display while preserving the 3D-type of presentation. In this manner, a user equipped with a relatively inexpensive 3D viewing device (such as 3D glasses) is able to have the desired "3D experience" without requiring an expensive 3D display device. In particular, an incoming "side-by-side" (SBS) 3D video stream is re-formatted by the inventive interface component into a "frame sequential" (serialized) format that appears as a conventional video stream to the 2D display. The inventive interface component also generates as an output a timing signal (synchronized with the converted frames) that is transmitted to the 3D viewing device. Therefore, as along as the 3D viewing device remains synchronized with the sequence of frames shown on 2D display 10, the user will actually be viewing an interactive 3D video.

One or more exemplary embodiments of the present invention may also utilize frame markers to distinguish between "left-eye" frames and "right-eye" frames upon conversion into the frame sequential format, where these markers may be utilized to ensure that the 3D viewing device remains synchronized with the presented video stream.

An exemplary embodiment of the present invention takes the form of a 2D/3D video conversion apparatus comprising a 2D/3D interface disposed to intercept an incoming 3D video stream. The 2D/3D interface is configured to re-format the incoming 3D video stream into a frame sequential format compatible with standard 2D display devices, as well as generate an output timing signal (synchronized with the transmission of each output frame). The apparatus also includes a 3D viewing device configured to receive as an input the timing signal generated by the 2D/3D interface, such that a user looking through the 3D viewing device perceives a projection of 3D images on a 2D display device receiving the frame sequential video format created by the 2D/3D interface.

These and other embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As will be described in detail below, the present invention relates to interface apparatus that converts a conventional (i.e., 2D) display device into a full-fledged stereoscopic 3D display without requiring any modifications of the display device itself. As long as a user has access to a 3D viewing device (such as 3D shutter glasses, a 3D "shutter" app on a smart phone, or the like), the images projected on a conventional 2D display will take the form of an interactive 3D display that may be manipulated by the user in the same manner as heretofore only possible with an expensive, high-end 3D display device.

Figure 1:
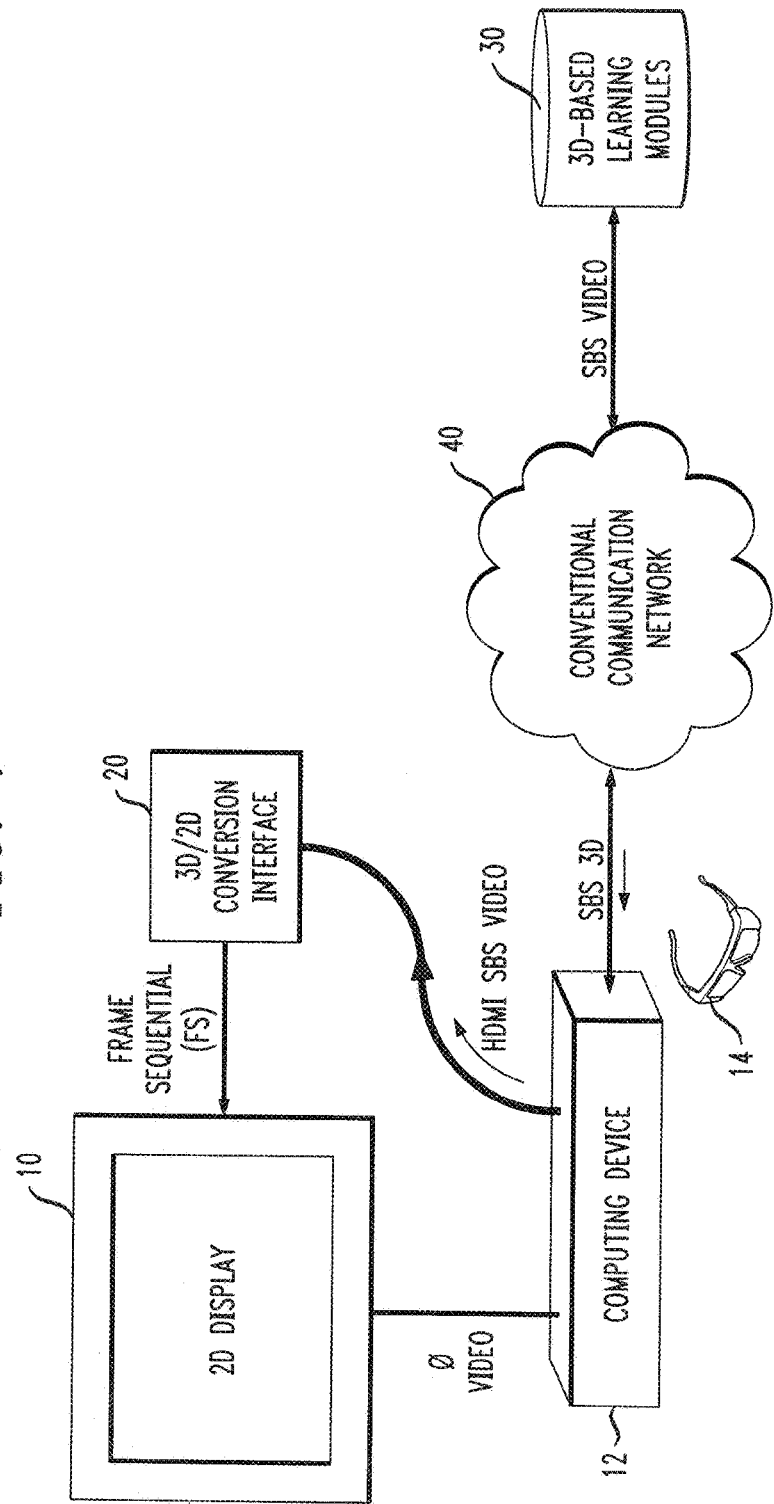
FIG. 1 illustrates an exemplary setting for using the 2D/3D display conversion interface of the present invention.

FIG. 1 illustrates an exemplary setting for use of a 2D/3D display conversion interface apparatus of the present invention. In particular, FIG. 1 depicts a conventional (2D) display 10 that is paired with a user's computing device 12 (which may a laptop component physically attached to display 10, a desktop computer associated with display 10, or any other suitable computing apparatus). Also shown in FIG. 1 is an exemplary 2D/3D conversion interface 20 formed in accordance with the present invention to intercept 3D video content received by computing device 12, and convert the 3D formatted video into a format compatible with the graphics capabilities of 2D display 10.

As discussed in detail below, 2D/3D conversion interface 20 functions to override the video processing portion of computing device 12, re-formatting the incoming 3D video stream into a version compatible with 2D display 10 while preserving the 3D-type of presentation. In this manner, a user equipped with relatively inexpensive 3D glasses 14 (or a "3D glasses" app on a smart phone) is able to have the desired "3D experience" without requiring an expensive 3D display device. 2D/3D conversion interface 20 also generates as an output a timing signal (synchronized with the converted frames) that is transmitted to 3D glasses 14 (typically a low-power, short-range signal, using Bluetooth or IR means, for example). Therefore, as along as 3D glasses 14 remain synchronized with the sequence of frames shown on 2D display 10, the user will actually be viewing an interactive 3D video.

In the exemplary configuration shown in FIG. 1, computing device 12 receives an incoming multimedia stream from an external source 30, where external source 30 is depicted in this instance as a source of software-based learning modules that utilize 3D objects as an integral part of the learning experience. The user communicates with external source 30 via a conventional communication network 40. Thus, for situations where a student would like to participate in a distance learning endeavor with external source 30, but cannot afford the expense associated with a high-end 3D display device, 2D/3D conversion interface device 20 of the present invention may be used, and simply connected between the user's computer and display device. By maintaining the bi-directional communication link between the user and external source 30, the user is able to use control commands (entered via a keyboard, 3D mouse, smartphone-enabled device, etc.) to manipulate the actual 3D projection.

Figure 2:
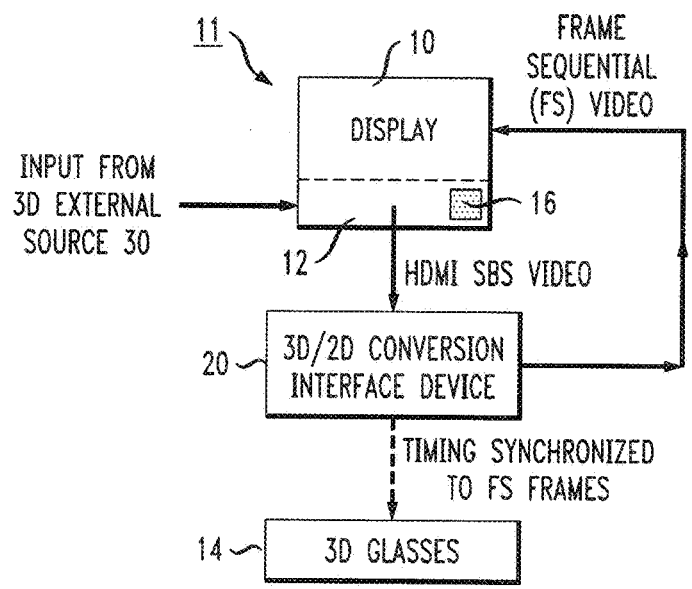
FIG. 2 presents an overview of the methodology of the present invention.

Reference is made to FIG. 2, which illustrates an overview of the methodology of the present invention. In this example, display 10 and computing device 12 take the form of a laptop 11 that incorporates both display 10 and computer device 12. The example of a laptop emphasizes the need for the inventive 2D/3D conversion interface, since an individual using such a laptop would not typically be able to afford the expense of a separate 3D monitor and hardware upgrade to the laptop's graphic card in order to receive (and interact with) 3D-formatted videos.

As shown, computing device 12 receives an incoming multimedia stream from external source 30, where the stream is identified as being encoded in a "side-by-side" (SBS) 3D format (described below in association with FIG. 3). Instead of directing this incoming SBS 3D video stream into a graphics card 16 (for example) included within computing device 12, the presence of 2D/3D conversion interface 20 causes the incoming video stream to bypass graphics card 16 and instead be re-directed into 2D/3D conversion interface 20 itself. Various hardware/software configurations may be used to implement this "bypass" process. For example, the attachment of 2D/3D conversion interface 20 to computer device 12 (such as in the form of a dongle) may trigger a process within computing device 12 to "temporarily" re-direct the signal path for the incoming video stream. Upon removal of device 20 from the port of computing device 12, computing device 12 then returns to its default configuration, with the video input directed along a signal path to included graphics card 16.

In accordance with this embodiment of the present invention, 2D/3D conversion interface 20 is utilized to re-format the incoming SBS 3D video stream into a "frame sequential" (hereinafter referred to as "FS") stream that is compatible with the graphics capability of computing device 12, and may be presented and viewed on conventional 2D display 10 (when using 3D glasses) to provide a "3D experience" to the user. FIG. 3 illustrates how the SBS formatted 3D video stream is re-configured into an FS video format. In the SBS format, a full frame is intended for viewing by both eyes at the same time. A first SBS frame is shown in FIG. 3 as having a left-half display 1 (for the left eye) and a right-half display 2 (for the right eye), with the next SBS frame comprising a left-half display A and right-half display B, and so on. When applied as a direct input to a specialized 3D display device, a processor module within the display device is able to extract necessary frame resolution information and present the 3D image.

Figure 3:
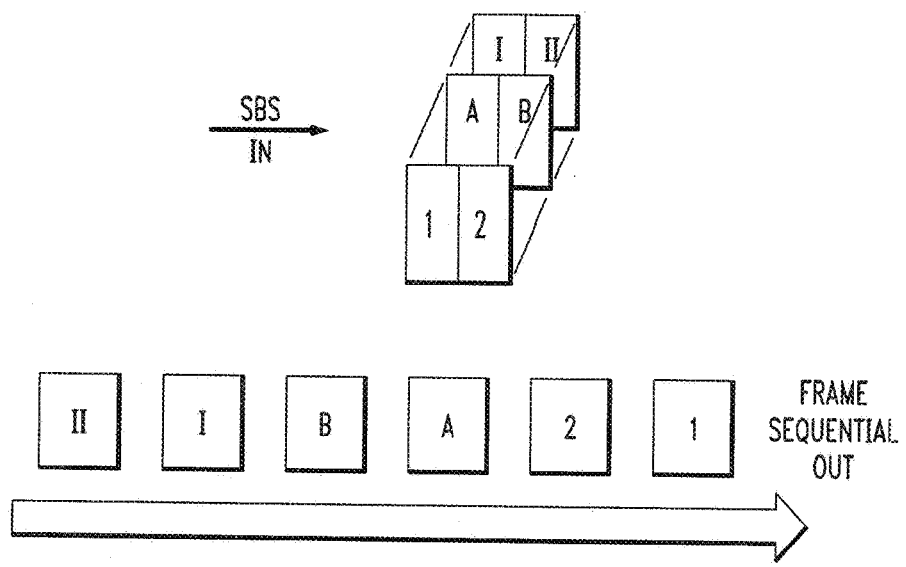
FIG. 3 contains diagrams illustrating the process of converting incoming SBS 3D frames into a suitable "frame sequential" format.

In accordance with the present invention, these SBS 3D video frames are re-formatted by 2D/3D conversion interface 20 into the FS format, as also shown in FIG. 3. By knowing the incoming frame rate and resolution, interface 20 is able to split each incoming frame into two separate frames and interpolate sufficient pixels to provide a full-size frame output from each half-size frame input. As a result, a "frame sequential" (FS) video stream is provided as an output of 2D/3D conversion interface 20, and is thereafter applied as the conventional "video input" to display 10, as shown in FIG. 2. By knowing and maintaining the frame rate created for the FS video output, 2D/3D conversion interface 20 provides this frame rate as a "timing signal" output that is transmitted to 3D glasses 14 (using Bluetooth technology, perhaps) so that the user's viewing will be synchronized with actual video being displayed. It is to be noted that any latency involved in the signal path between interface 20, computing device 12 and display 10 is to be taken into consideration in creating the timing signal.

As mentioned above, a 2D/3D conversion interface formed in accordance with the teachings of the present invention may be utilized with various types of computing devices that are paired with conventional 2D displays. For example, a properly configured smartphone may be used as a "computing device" as along as the smartphone has established a communication link with a 2D display (i.e., "paired with" the 2D display).

Figure 4:
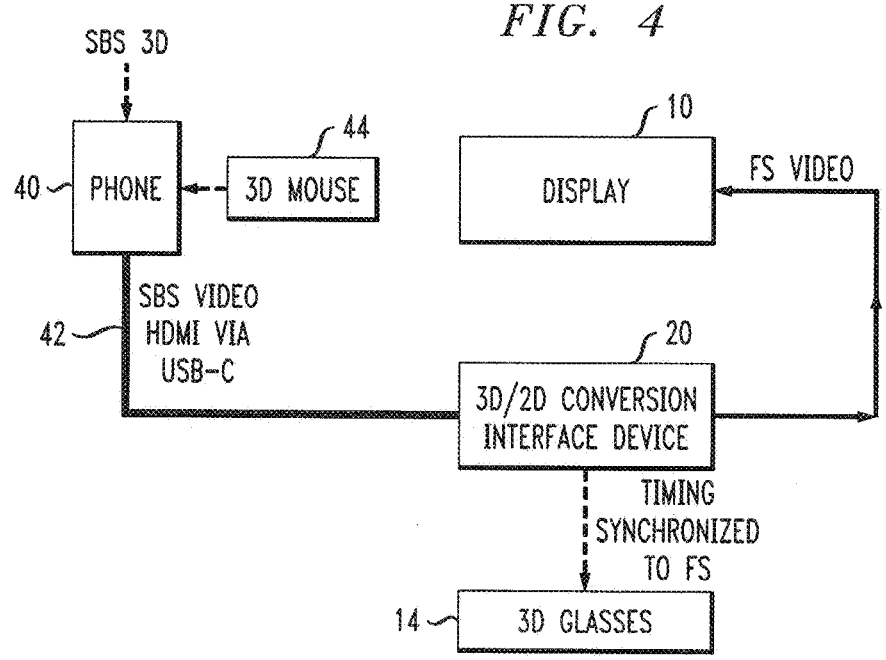
FIG. 4 illustrates an embodiment of the present invention utilizing a smartphone and associated 2D display for operating with the inventive 2D/3D interface.

FIG. 4 contains a diagram illustrating an exemplary embodiment of the present invention for a smartphone-enabled arrangement. In this particular embodiment, a smartphone 40 receives the incoming multimedia stream (comprising an SBS 3D video stream). In this particular configuration, smartphone 40 is physically coupled to 2D/3D conversion interface 20 via a USB-C cable 22 (other cables capable of supporting HDMI signal transfer may be used). Interface 20 functions in the same manner as described above, creating the FS video output and directing this signal to the video input port of display 10 (with 3D glasses 14 using the received timing signal to properly render the 3D video for the user). A 3D mouse 44 may be paired with phone 40 to thereafter control movements of 3D objects presented on display 10. It is to be noted that the capabilities of 3D mouse 44 may be somewhat limited by the performance parameters of phone 40.

Figure 5:
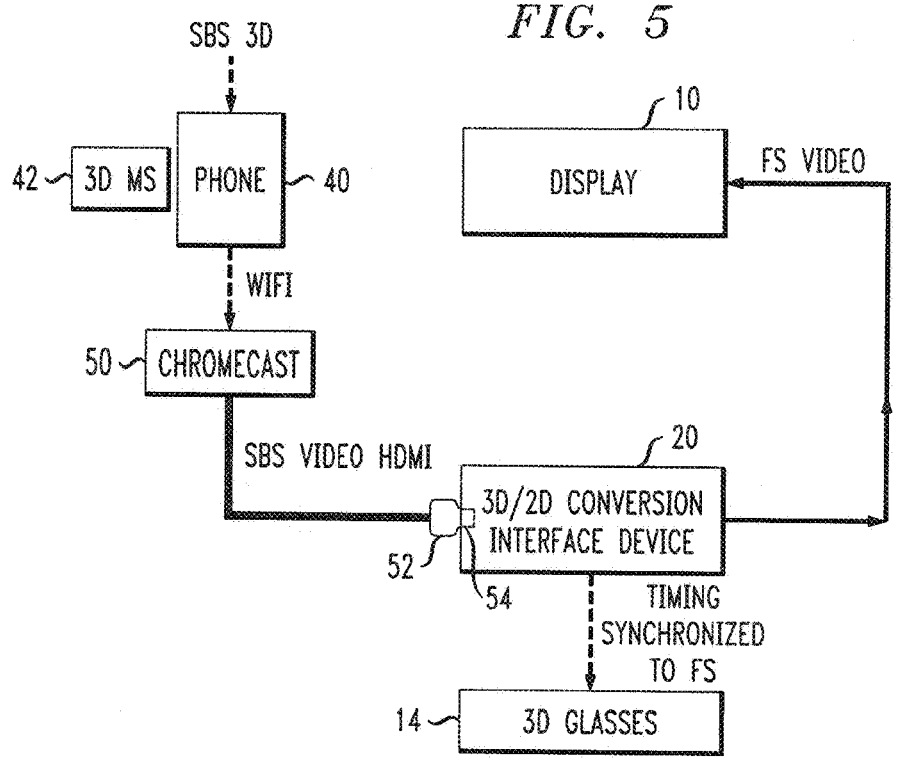
FIG. 5 shows an alternative configuration for the embodiment of FIG. 4.

FIG. 5 illustrates another configuration of the embodiment of FIG. 4, where in this case phone 40 communications with 2D/3D conversion interface 20 through a chromecast receiver 50, eliminating the need for a direct, physical connection (such as cable 42, shown in FIG. 4) between phone 40 and interface 20. Instead, the multimedia stream received by phone 50 is sent over a WiFi link to chromecast receiver 50, which processes the signal into an HDMI-compatible form useful as an input for interface 20. In some cases, chromecast receiver 50 may take the form of a dongle 52 presented at a USB port 54 of interface 20.

Figure 6:
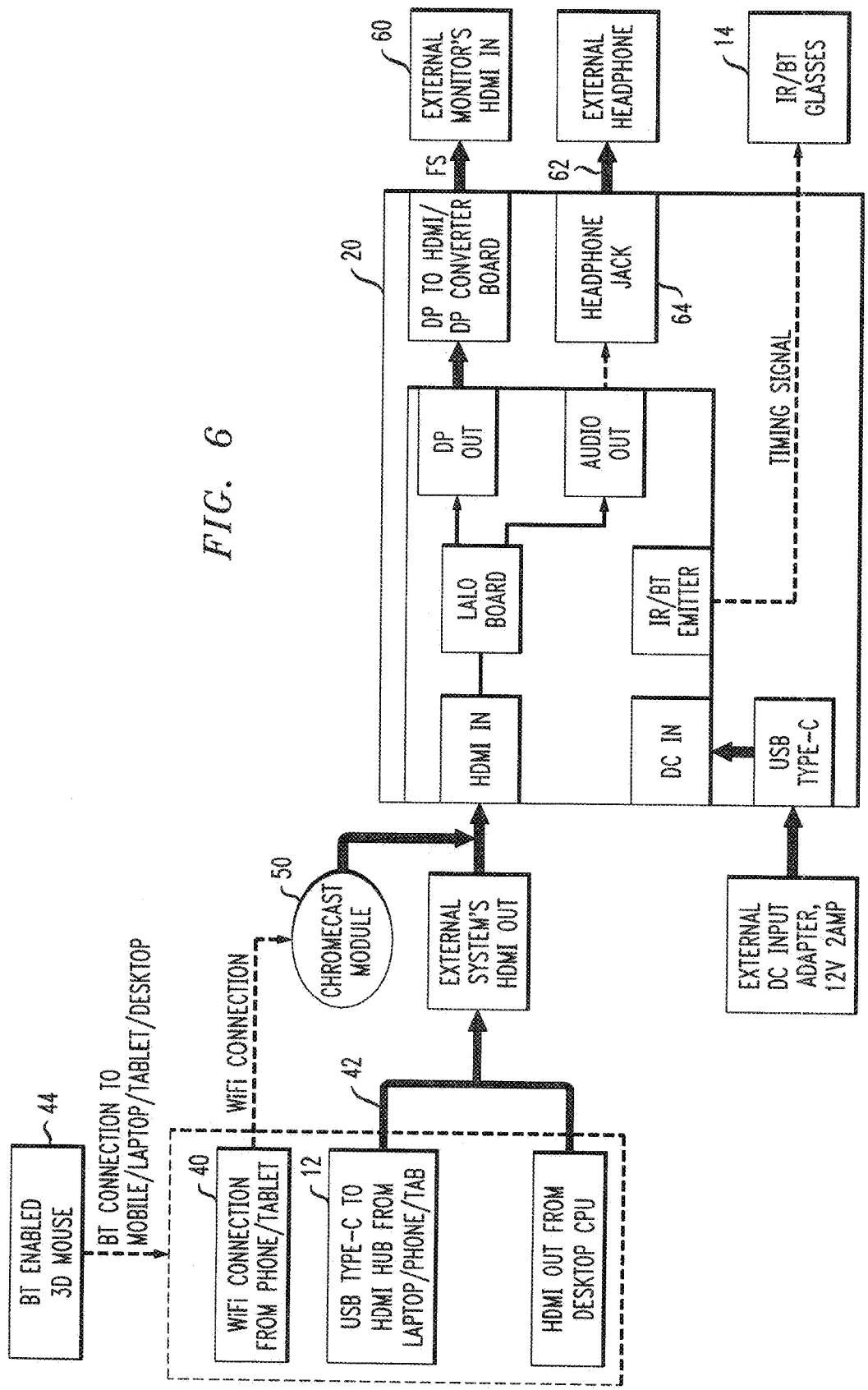
FIG. 6 depicts an exemplary 2D/3D display conversion interface component configured for use with multiple, different types of input devices.

FIG. 6 is an overview diagram illustrating an exemplary interface component 20A formed in accordance with the present invention to handle 3D video input from a variety of different sources (e.g., a desktop CPU, laptop, tablet, phone, etc.). As described above in accordance with the various embodiments of the present invention, interface component 20A functions to receive SBS 3D video information and generate an FS version of this data that is thereafter sent to display 10 (via "HDMI IN" 60, as shown in FIG. 6), while also sending the associated timing signal to 3D glasses 14. The configuration of FIG. 6 also illustrates an exemplary audio output 62 that may be provided as well via a headphone jack 64.

Inasmuch as the actual graphics card within computing device 12 that controls display 10 is not accessible by 2D/3D conversion interface 20, the situation may arise where selected "frames" within the FS output from interface 20 are not properly handled by computing device 12 and, therefore, not displayed in the intended sequence on display 10. For example, a given frame may be "dropped" by computing device 12, or an extra frame inserted or, perhaps worse, frames become displayed out of order. Particularly, the "out of order" presentation may take the form of: (L/R), (L/R), (R/L), (L/R), (L/R), . . . , where the appearance of two "right" frames in a row may suddenly change the depth perception of the 3D stereoscopic image being viewed by the user (wearing the 3D glasses, which have intentionally different "left" and "right" viewing lenses).

In addition to this problem, it may be difficult for computing device 12/display 10 to know in advance whether an incoming frame is a "left-eye" frame or a "right-eye" frame in the first instance. Thus, a user may see the same 3D scene at one depth one time, and another depth if viewed again at a later point in time. Since one likely use for the interface of the present invention is in the presentation of educational material, any possibility for confusion on the part of the student should be avoided if at all possible.

Thus, another embodiment of the present invention addresses these concerns by incorporating a visible "frame identity marker" at a predetermined location of the frame, with a first mark associated with "left-eye" frames and a second mark associated with "right-eye" frames. The associated 3D viewing device (for example, 3D glasses) are configured to recognize these marks and control the shuttering of the left and right lenses accordingly.

Figure 7:
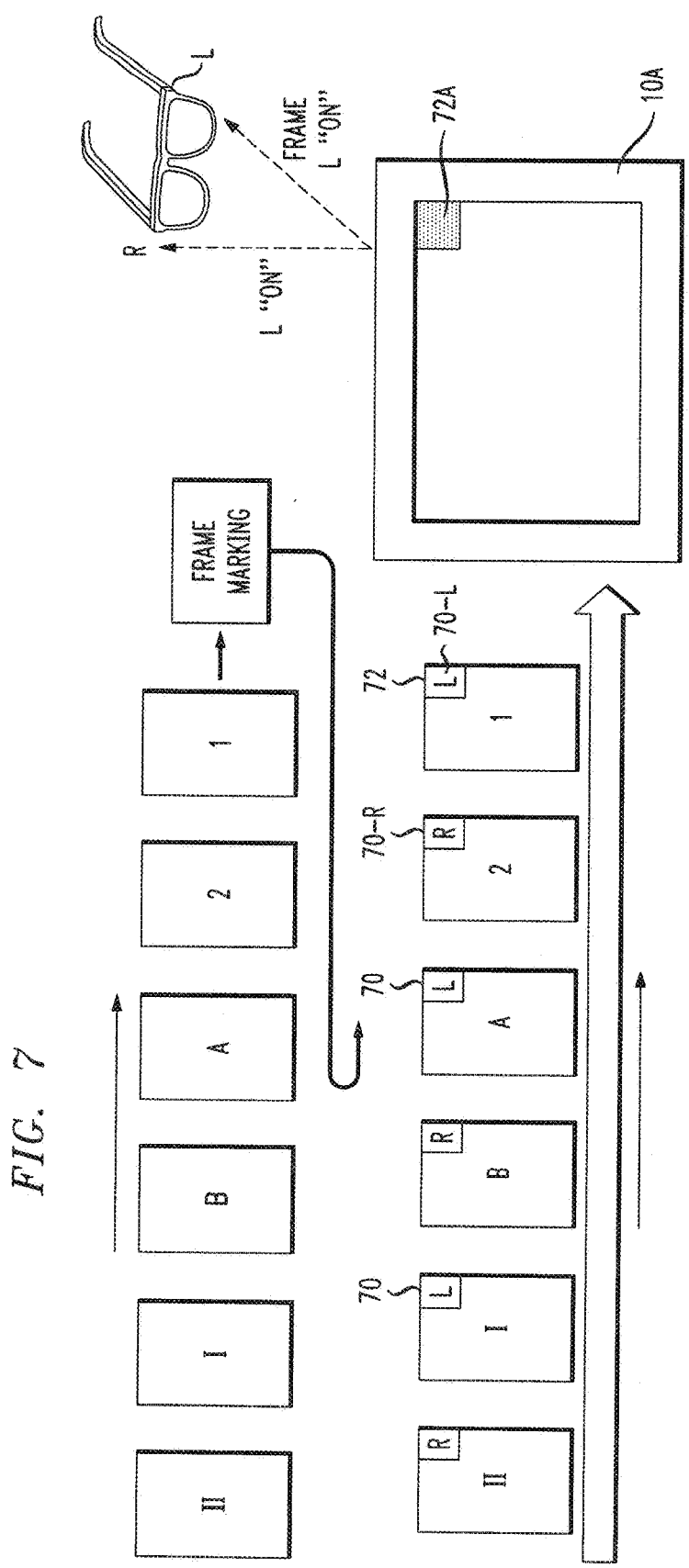
FIG. 7 contains diagrams illustrating an additional feature of the present invention related to frame marking for maintaining synchronization between a 2D display and a 3D viewing device.

FIG. 7 illustrates this concept of the present invention. As shown, upon creation of full-frame "left-eye" frames and "right-eye" frames for the FS output, a frame identity marker 70 is included at location 72 of each frame, where marker 70 comprises a first form 70-L to identify left-eye frames and a second form 70-R to identify right-eye frames. These markers are preferably included at a side/edge location 72 that will not interfere with the user's interaction with the 3D projection. An exemplary display 10A is included in FIG. 7, showing marker 70 positioned at an exemplary location 72A.

In one exemplary embodiment, first form 70-L and second form 70-R may comprise two different intensity values, two different symbol values, two different colors, etc., any type of visually distinct images. A frame recognition element 74 (which may be a relatively simple intensity measurement device, color filter, etc.) is used to identify the type of incoming frame and transmit a "frame type" signal to 3D glasses 14A. Therefore, from a user's perspective, 3D glasses 14A will always be in sync with the presented frames, and if there is any transposition in frame stream, the inclusion of the marker will prevent 3D glasses 14A from switching from "right" to "left" when two "right" frames are received in a row (for example).

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. A 2D/3D video conversion apparatus comprising
a 2D/3D interface component disposed between a video processor of a computing device and a 2D display device and utilized to intercept an incoming 3D video stream of a side-by-side (SBS) video format, with left-eye and right-eye half-size frames forming each received frame, the 2D/3D interface component configured to re-format the incoming SBS 3D video stream into a frame sequential format video signal compatible with standard 2D display devices by splitting each incoming frame into a pair of half-size frames such that each half-size frame occupies a separate output frame in the transmission sequence, the 2D/3D interface component further configured to interpolate additional pixels for each output frame so as to provide a full-size output frame for each presented half-size frame, and also generate a timing signal output, the timing signal synchronized with the transmission of each separate full-size output frame of the frame sequential output, the frame sequential format video signal thereafter directed as an input to the 2D display device;
a 3D viewing device configured to receive as an input the timing signal generated by the 2D/3D interface component, wherein a user looking through the 3D viewing device perceives a projection of 3D images on the 2D display device receiving the frame sequential format video signal created by the 2D/3D interface component; and
a 3D controller device associated with the user for selecting and manipulating 3D objects appearing on the 2D display.

2. The 2D/3D video conversion apparatus as defined by claim 1 wherein the 2D/3D interface component is further configured to include a frame marker on each full-size output frame provided as an output to the associated 2D display device.

3. The 2D/3D video conversion apparatus as defined by claim 2 wherein the frame marker comprises a first marker to be included on each left-eye frame and a second marker to be included on each right-eye frame.

4. The 2D/3D video conversion apparatus as defined by claim 1 wherein the 3D viewing element comprises 3D shutter glasses, controlled by the timing signal to provide viewing through a left lens and a right lens.

5. The 2D/3D video conversion apparatus as defined by claim 3 wherein the 3D viewing element comprises 3D shutter glasses, controlled by the displayed frame markers to provide viewing through a left lens and a right lens.

\* \* \* \* \*